United States Patent [19]

Jenkins

[11] Patent Number: 4,472,231
[45] Date of Patent: Sep. 18, 1984

[54] HIGH SHEAR RESISTANT PIPEWRAP ANTI-CORROSION SYSTEM
[75] Inventor: Robert F. Jenkins, Lynn, Mass.
[73] Assignee: The Kendall Company, Boston, Mass.
[21] Appl. No.: 399,597
[22] Filed: Jul. 19, 1982
[51] Int. Cl.³ ............................................. C09J 5/02
[52] U.S. Cl. ................................. 156/307.5; 138/144; 138/DIG. 1; 138/DIG. 6; 156/187; 156/192; 156/195; 156/310; 156/334; 156/338; 242/7.02; 242/7.23; 427/220; 428/420
[58] Field of Search ............... 156/187, 310, 192, 334, 156/195, 338, 307.5; 428/420; 260/730, 759; 138/144, DIG. 1, DIG. 6; 242/7.02, 7.23; 427/220

[56] References Cited

U.S. PATENT DOCUMENTS

| 2,161,036 | 6/1939 | Gremmel et al. | 156/187 |
| 3,002,854 | 10/1961 | Brill | 156/309.3 |
| 3,063,891 | 11/1962 | Boylan et al. | 156/310 |
| 3,160,595 | 12/1964 | Hardman et al. | 260/759 |
| 4,268,334 | 5/1981 | Harris et al. | 156/187 |

FOREIGN PATENT DOCUMENTS 704096 2/1954 United Kingdom ............... 156/195

Primary Examiner—John J. Gallagher
Attorney, Agent, or Firm—Frederick R. Cantor

[57] ABSTRACT

An anticorrosion and high shear resistant pipewrap system is described wherein a pipe surface is first coated with a primer comprised of natural rubber, resins, and a metal oxide activator dispersed in an organic solvent. The primer-coated pipe is then overlaid with an adhesive-coated polyolefin tape, the adhesive comprising a butyl-based rubber, tackifying agent and a cross-linking agent, p-quinone dioxime. The cross linking agent functions in the presence of an organo-titanate-treated metal oxide, being a catalyst such as lead dioxide, or the like, that results in high rates of cross linking in both the primer coating, the adhesive coating and the primer-/adhesive interface zone. Minimal creep of the described anti-corrosion protective coating is noted in high shear stress environments.

12 Claims, 1 Drawing Figure

HIGH SHEAR RESISTANT PIPEWRAP ANTI-CORROSION SYSTEM

BACKGROUND OF THE INVENTION

This invention relates to improved anti-corrosion protective coatings for metal surfaces.

This invention further relates to improved anti-corrosion protective coatings for the surface of metal pipes that are destined for inground implantation.

The instant invention most particularly relates to helically-wrapped anti-corrosion protective coatings for the surface of metal pipes that are to be subjected to an inground high shear stress environment.

It has previously been the practice to provide anti-corrosion protective pipe coatings by supplying, in roll form, preformed polyolefin tapes, having one surface that is coated with a butyl-based adhesive, comprising a mixture of both virgin butyl rubber and reclaimed butyl rubber.

It has also been proposed previously to extrude both the polyolefin tape and the adhesive layer simultaneously, either separately, or as a coextrusion, directly onto the surface of a rotating pipe structure. This method, of course, is not suitable for over-the-ditch anti-corrosion protective tape-wrapping procedures.

Anti-corrosion protective coatings that are applied to inground pipeline structures are often subjected to rather severe long-term shearing forces derived from the surrounding soil. The magnitude of these shearing forces depends upon several factors, including amongst others: (a) the type of the soil, (b) the tectonic forces surrounding the implanted pipeline, (c) the size of the pipe, (d) the axial site emplacement and (e) the range of thermal expansion of the pipe as well as its contents.

In order to understand how each of the above factors affect the overall shear stress imparted to an inground pipeline coating, we first shall consider the forces acting upon implanted pipelines.

Frictional forces acting between the pipeline anti-corrosion protective coating and the surrounding soil are the primary source of shear stress. Frictional forces are here defined as the product of the frictional coefficient between the pipeline coating and the soil and the normal force acting around the pipe. As the coefficient of friction depends upon both the nature of the pipeline coating as well as the surrounding soil, it will be found to vary in different applications. Olefin polymer pipeline protective coatings, such as polyethylene, or the like, inherently exhibit lower coefficients of friction, as the protective tape outer surfaces are smooth and substantially non-adherent.

Other factors having importance in these considerations are the weight of the soil above the pipe, as well as the weight of the pipe, including its contents. In addition, since the normal force will vary depending on the axial position around the pipe diameter, the frictional force and hence the shearing force, will also be found to vary around the diameter of the pipe.

The result of long-term shear forces on a pipeline protective coating is referred to as "soil stress." Soil stress on anti-corrosion protective coatings generally results from the structural shear forces which cause the protective coating to creep along the pipeline peripheral surface.

Creep is, in essence, a long term visco-elastic, or "cold-flow" phenomenon, common to all polymeric substances. The amount of creep, however, will depend upon the physical properties of a coating. Since the physical properties (i.e. modulus) of a coating, will be temperature dependent, temperature becomes a decisive element in determining the amount of creep. At low temperatures, the propensity of the protective coating to creep will be substantially reduced, while at elevated temperatures, the likelihood of creep will be significantly increased, other factors remaining the same.

However, adhesive resistance to flow or creep, may be improved by introducing crosslinks between the component rubber chains.

When a rubber-based, or the like, adhesive system is crosslinked, (1) its resistance to creep is increased, (2) the overall dimensional stability is improved, and (3) it is more resistant to heat distortion. In addition, the above-listed crosslinking effects are generally intensified as the crosslink density is increased, and can therefore be controlled by adjusting the number of crosslinks in an adhesive coating. Crosslinking provides numerous anchoring points for the individual rubber chains, and these anchor points restrict excessive movement within the rubber of the adhesive, thereby resulting in limited creep or flow of the polyolefin tape coating.

SUMMARY OF THE INVENTION

An object of the present invention is to provide an improved anti-corrosion protective coating for the surface of metal pipes that are designed for inground implantation.

Another object of the instant invention is to provide a multi-component, helically-wrapped, anti-corrosion protective coating for the surface of metal pipes that are to be subjected to a high shear stress inground environment.

A typical conventional pipewrap anti-corrosion protective system may comprise a primer that is applied to the pipeline outer surface, and an anti-corrosion protective adhesive tape overlaying the primer coating. The primer in the conventional pipewrap anti-corrosion system is typically a mixture of rubber and resins, which may be applied to the pipeline outer surface, by means of spraying, brushing, dipping or rugging. The adhesive tape is generally composed of a polyolefin backing material, such as polyethylene, or the like, with a rubber-based adhesive that is coated onto a surface of the polyolefin backing material. In the conventional pipewrap anti-corrosion protective system there is no crosslinking agent present in either the primer or the adhesive tape components.

The present invention, in contradistinction, comprises a two component interacting pipewrap anti-corrosion protection system, one component being a primer, preferably a mixture of solvent, natural rubber and resins. The present invention primer is preferably utilized with the incorporation of a crosslinking activator, in this invention, an organo-titanate-treated metal oxide.

The adhesive-coated polyolefin backing material may be a polyethylene material, or the like. The adhesive coating is a butyl-based rubber mixture applied to one surface of the polyethylene, or the like, backing material by conventional processes, and is a partially crosslinked material.

The partial crosslinking of the adhesive coated onto the polyolefin tape backing material, is effected by means of both heat and the crosslinking agent, p-quinone dioxime. Lead dioxide ($PbO_2$), that has been previously surface-treated with an organo-titanate coupling agent, is dispersed throughout the primer coating. The organo-titanate surface-treated lead dioxide remains in solution in the liquid primer, rather than precipitating out of solution, and serves primarily in the system as a crosslinking catalyst to increase both the speed and yield of the crosslinking reaction effected primarily by the crosslinking agent, p-quinone dioxime. If the lead dioxide is not surface-treated with the organo-titanate coupling agent prior to the use of the lead dioxide as the crosslinking catalyst, the crosslinking reaction will take place at a considerably slower rate, thereby severely limiting the usefulness of the metal oxide as a crosslinking catalyst.

Initial partial crosslinking of the rubber chains in this two component pipewrap anti-corrosion protective system occurs only in the adhesive component layer.

As the polyethylene adhesive tape, containing a critical level of residual, unreacted crosslinking agent (p-quinone dioxime), in its adhesive coating, is placed into contact with the primer-coated pipe outer surface, a further crosslinking reaction then occurs at the primer-adhesive interface zone, as well as throughout the primer layer and the adhesive layer of the polyethylene backing material. This additional crosslinking in the primer-adhesive interface zone, as well as the primer and adhesive layers, is aided in part by the elevated temperature of the operating pipeline and its contents. Further, this additional crosslinking reaction results in an improved ability of the instant system to resist tape creep caused by high shear forces.

The crosslinking reaction in the present invention results in increasing the cohesive strength, and consequently the shear resistance, of both the adhesive and primer layers. The primer-adhesive interface zone of crosslinking following the application of the adhesive-coated tape to the primer-coated pipe surface results in a completely inter-crosslinked adhesive/primer system. It is important to note here that the crosslinking at the adhesive/primer interface zone, following application of the adhesive tape, serves to markedly increase the adhesion of the polyolefin tape to the primer-coated pipe, thereby reducing significantly the creep caused by high shear stress forces in situ. Further, the increase in the speed and extent of the crosslinking reaction rate, due in part to the uniformly dispersed organo-titanate-treated lead dioxide activator, results in the above-described improved anti-creep characteristics in the presence of soil shear forces.

BRIEF DESCRIPTION OF THE DRAWINGS

In order that the invention be more readily understood, and so that further features thereof may be appreciated, the invention will now be described by way of example with reference to the accompanying drawings, in which.

DESCRIPTION OF THE PREFERRED EMBODIMENT

Figure 1:
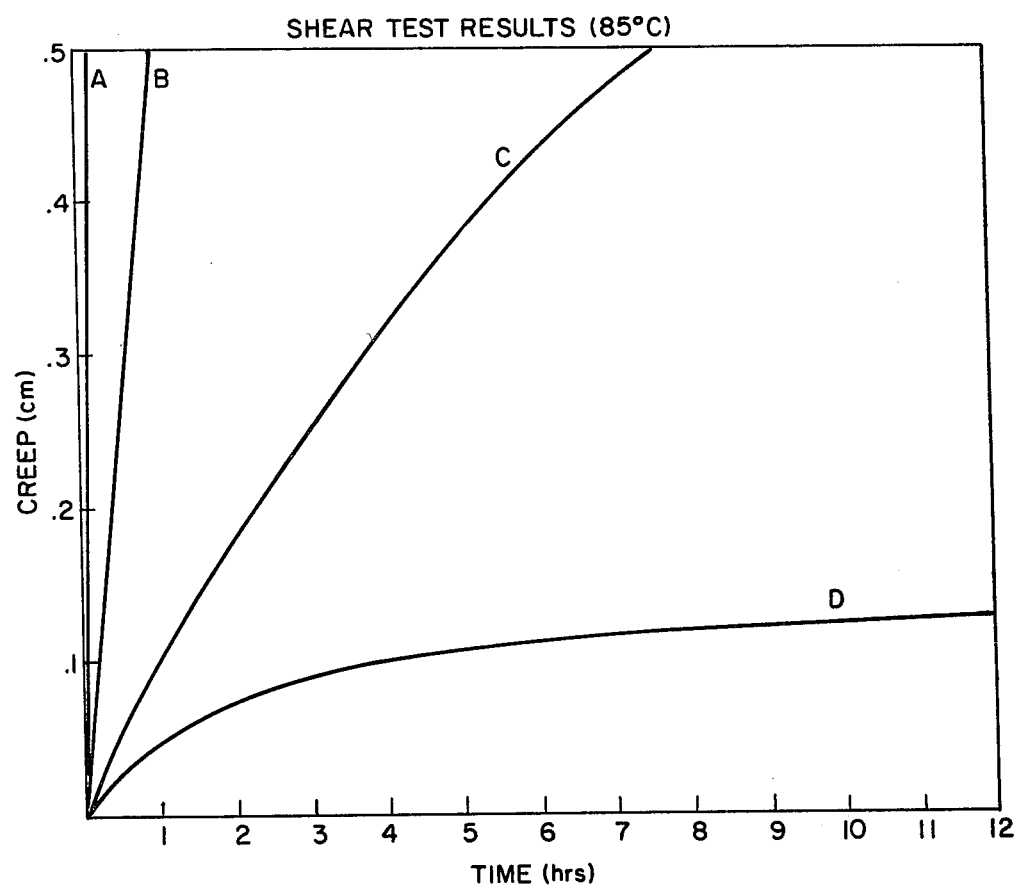
FIG. 1 represents effects of elevated temperatures and time on crosslinking and resistance to shear force induced creep in an exemplary embodiment of the present invention.

As discussed above, the present invention represents a unique two component pipe-wrap anti-corrosion system, consisting of a primer coating and an adhesive-coated olefin polymer tape designed to provide a high shear resistant anti-corrosion pipe wrap protective system in environments of high soil shear forces.

The primary anti-corrosion outer protective layer consists of an olefin polymer tape web backing, such as polyethylene, or the like. Typically this polyethylene tape web backing material is from between 9 and 20 mils in thickness, but may be from between 5 to 30 mils in certain applications. Coated onto one surface of the olefin polymer backing is an adhesive, being a butyl rubber-based adhesive, having in most applications a typical thickness of from between 5 to 30 mils.

In the present invention, a rubber chain crosslinking agent, preferably p-quinone dioxime, is incorporated into the adhesive during Banbury mixing of the adhesive coating composition. The concentration of the p-quinone dioxime crosslinking agent incorporated at this initial stage, is preferably from between about 0.25 to 0.45 percent by weight of the adhesive mixture.

In an exemplary embodiment of the present invention a partial level of crosslinking occurs in the adhesive mixture during the Banbury mixing by the incorporation of from between about 0.25 to 0.45 percent by weight of the p-quinone dioxime crosslinking agent.

Due to the extremely high reaction temperatures that are attained during Banbury mixing of the adhesive composition, i.e., 350° F., no crosslinking metal oxide activitor is necessary to achieve this partial crosslinking of the adhesive. This initial partial crosslinking reaction throughout the adhesive composition serves to increase the initial cohesive strength of the adhesive.

In a second adhesive mixing step, generally performed on a two roll mill, a hydrocarbon tackifying agent is then added to the adhesive mixture. In the instant invention an additional quantity of 0.25 percent by weight of p-quinone dioxime crosslinking agent is then added during this milling step. It has been found that a minimal residual quantity of p-quinone dioxime of at least 0.10 percent by weight is required to be added during this milling step. As the milling step temperature is maintained relatively low, i.e. typically about 200° F., only a minimal amount of additional initial adhesive composition crosslinking will occur during this step.

The above-described procedure results in an adhesive composition, which has been significantly strengthened by the introduction of initial partial crosslinking of the rubber chains of the adhesive during the Banbury mixing. The adhesive at this point also contains a residual level of available unreacted crosslinking agent, p-quinone dioxime.

It is to be noted here that the presence of this residual amount of unreacted p-quinone dioxime, will later be utilized in an additional crosslinking reaction taking place at the interface zone between the primer layer and the adhesive layer, as well as in the primer and adhesive layers, when the adhesive of the polyolefin tape and the primer come into contact on the pipe surface.

The pipe-coating primer component of the present invention comprises a mixture of natural rubber and resins that are dispersed in an organic solvent. The primer also contains a metal oxide crosslinking activator catalyst, preferably being lead dioxide ($PbO_2$). The lead dioxide activator is present in the primer mixture of an exemplary embodiment of the present invention in a concentration of up to 15 percent by weight, based on total solids, with about 5 percent being the preferable concentration.

The lead dioxide activator present in the primer is first surface-treated, employing an organo-titanate coupling agent. This surface treatment of the lead dioxide in the presence of an organo-titanate aids in the lead dioxide remaining in solution in the primer mixture solvent. It should also be noted here that the surface treatment of the lead dioxide activator by the organo-titanate serves primarily to speed up the crosslinking reaction cure rate of the tape/primer system of the present invention.

In the practice of the present invention, the initial step is the application of the above-described primer mixture to a metal pipeline outer surface, either in the factory or over-the-ditch. Following the primer application step, the above-described partially crosslinked adhesive-coated olefin polymer tape material is generally helically over-layered on top of the previously applied primer surface coating.

At this point of the adhesive-coated tape overlayering, due to the presence of both the residual amounts of the crosslinking agent p-quinone dioxime found in the adhesive coating, as well as the excess quantities of the metal oxide crosslinking activator - lead dioxide, in the primer coating and aided in part by the heat of the operating pipeline, an additional crosslinking reaction occurs both at the interface zone of reaction between the primer coating and the adhesive coating of the polyethylene layer, as well as throughout the remainder of the adhesive and primer coating layers.

This additional in situ overlayering-initiated crosslinking reaction results in a highly improved resistance of the entire applied tape-primer system to shear force creep.

FIG. 1 represents effects of elevated temperatures and time on crosslinking and resistance to shear force induced creep in an exemplary embodiment of the present invention.

FIG. 1 illustrates the results of a laboratory test designed to evaluate the shear force resistance of pipewrap systems under conditions which simulate the typical forces acting on a buried pipeline.

This test incorporates both a normal force as well as a shearing force. The normal force is used to simulate forces which might result from the weight of the soil. The shearing force is used to simulate the frictional force exerted between the soil and pipewrap coating, which might arise from such factors as soil settling and expansion and/or contraction of the soil following changes of moisture content.

These shear tests were all conducted at 85° C. Curve A represents the results for a conventional non-crosslinked tape/primer system at all cure times and all cure temperatures. It is to be noted, as no crosslinking agent is found in the conventional tape-primer pipewrap system, increasing temperature or, time will not lead to a crosslinking. Curve B represents the initial results for an exemplary embodiment of the present invention shear-resistant system cured at 23° for 4 hours. Curve C represents the results obtained after the sample was allowed to cure for 67 hours at 66° C. Curve D represents the results after the system was allowed to cure for 72 hours at 85° C. An increase in the present invention's ability to withstand shear force induced creep at elevated temperatures is strikingly evident. In addition, the present invention's ability to resist shear force induced creep is shown to increase markedly with increased crosslinking cure time and cure temperature.

It is also important to note here that this new pipewrap protective system has been designed to additionally crosslink on the pipe in situ. The heat required for this additional crosslinking reaction when the tape is applied to the primer, is supplied by the heat generated from an operating pipeline. The operating temperature of the pipeline, of course, will determine the rate at which the additional crosslinking reaction takes place. As a result, the present invention pipewrap anti-corrosion protective system may be applied either over-the-ditch or as an in-plant coating, the choice resulting from many factors.

The foregoing detailed description of the preferred embodiments of the present invention is given for purposes of clarity of understanding only, and no unnecessary limitations should be understood or implied therefrom, as modifications may be obvious to those skilled in the art.

The following specific examples are intended to illustrate more fully the nature of the present invention without acting as a limitation upon its scope.

EXAMPLES

The adhesive component of the present invention was prepared by initially mixing in a Banbury high speed mixer for 2.5 minutes at 350° F. the following components:

| Butyl Virgin Rubber | 234 gms |
| Butyl Reclaimed Rubber | 442 gms |
| Clay Filler (McNamee) | 341 gms |
| Antioxidant (Calco 2246) | 2.3 gms |

Then the following components were added to the mixture in Banbury high speed mixer and mixed for another 3.5 minutes at 350° F.:

| Clay Filler (McNamee) | 341 gms |
| Indipol Oil (RBH 100) | 189 gms |
| p-quinone dioxime | 5.4 gms |

The above Banbury-mixed adhesive composition was then placed into a two roll mill and a residual amount of p-quinone dioxime (3.9 gms) and hydrocarbon tackifier resin (Escorez 1102 (248 gms) was added and mixed for 20 minutes at 200° F.

The above adhesive coating mixture is then ready to be applied to a polyethylene backing layer on a calendar.

The primer component of the present invention was prepared by mixing in a Nauta high intensity blender at 150° F. all of the following:

| Natural Rubber (Reclaim) | 2,270 gms |
| Hydrocarbon tackifier resin (Zirex) | 1,906 gms |
| Toluene | 1,089 gms |
| Heptane | 16,798 gms |
| Lead Dioxide (Organotitanate-treated) | 209 gms |

The above primer coating mixture is then ready to be applied to a pipe surface.

What is claimed is:

1. A method of anti-corrosion coating of metal pipes, comprising the steps of:
   first applying a primer mixture to the outer surface of said pipe;
   said primer mixture comprising a blend of natural rubber, resins, and a crosslinking activator coated with organotitanate prior to incorporation in said primer mixture;

said cross-linking activator being a metal oxide; then over-laying said primer-coated pipe surface with an adhesive-coated tape;

said adhesive coated tape comprising an olefin polymer backing material, and having a rubber-based adhesive-coated onto a surface thereof;

said adhesive coating being initially partially cross linked, and comprising a blend of virgin butyl rubber and reclaimed butyl rubber, a tackifier, and a residual amount of unreacted crosslinking agent, being p-quinone dioxime.

2. The method of anti-corrosion coating of pipes, according to claim 1, wherein said crosslinking agent, p-quinone dioxime is present in a concentration range of from about 0.25 to 0.45 percent by weight.

3. The method of anti-corrosion coating of pipes according to claim 1, wherein said metal oxide is lead dioxide.

4. The method of anti-corrosion coating of pipes according to claim 3, wherein said lead dioxide is present in the concentration range of up to about 15 percent by weight of total solids.

5. The method of anti-corrosion coating of pipes according to claim 3, wherein the preferred concentration of said lead dioxide is about 5 percent by weight of total solids.

6. The method of anti-corrosion coating of pipes according to claim 1, wherein additional crosslinking occurs at the primer-adhesive layer interface, as well as throughout the rest of primer and adhesive layers following overlaying of the primer surface by the adhesive-coated tape.

7. An anti-corrosion coating for pipe surfaces comprising:

a primer mixture coating applied to outer surface of said pipes;

said primer mixture coating comprising a blend of natural rubber, resins, and a crosslinking activator coated with organotitanate prior to incorporation in said primer mixture;

said crosslinking activator being a metal oxide;

an adhesive-coated tape overlaying said primer-coated pipe surface;

said adhesive-coated tape comprising an olefin polymer backing material;

said polymer backing material having a rubber-based adhesive coated onto a surface thereof;

said adhesive coating being initially partially cross-linked, and comprising a blend of virgin butyl rubber and reclaimed butyl rubber, a tackifier, and a residual amount of unreacted crosslinking agent;

said crosslinking agent being p-quinone dioxime.

8. An anti-corrosion coating for pipe surfaces according to claim 7, wherein said crosslinking agent, p-quinone dioxime, is present in a concentration range of from about 0.25 to 0.45 percent by weight.

9. An anti-corrosion coating for pipe surfaces according to claim 7, wherein said metal oxide is lead dioxide.

10. An anti-corrosion coating for pipe surfaces according to claim 9, wherein said lead dioxide is present in the concentration range of up to about 15 percent by weight of total solids.

11. An anti-corrosion coating for pipe surfaces according to claim 9, wherein the preferred concentration of said lead dioxide is about 5 percent by weight of total solids.

12. An anti-corrosion coating for pipe surfaces according to claim 7, wherein additional crosslinking occurs at the primer-adhesive layer interface, as well as throughout the rest of primer and adhesive-layers following overlaying of the primer surface by the adhesive-coated tape.

* * * * *